United States Patent Office 3,428,642
Patented Feb. 18, 1969

3,428,642
CARBAMATES AND THIOCARBAMATES AND THE PROCESS OF PREPARATION AND THERAPEUTIC APPLICATIONS THEREOF
André Georges Debay, Paris, and Jacques Louis Marie Joseph Thery, Le Vesinet, France, assignors, by mesne assignments, to A. B. Astra, Sodertalje, Sweden
No Drawing. Filed Aug. 23, 1965, Ser. No. 481,959
Claims priority, application Great Britain, Sept. 2, 1964, 35,939/64
U.S. Cl. 260—295     6 Claims
Int. Cl. C07d 31/48, 31/34; A61k 27/00

ABSTRACT OF THE DISCLOSURE

The compounds are pyridylmethyl-, N-oxypyridylmethyl-, benzyl- or methoxybenzyl- N-monosubstituted carbamates and thiocarbamates. They are useful as sedative, hypnogenous and neuroleptic drugs.

---

The present invention relates to new compounds having in particular sedative, hypnogenous, and neuroleptic properties.

These compounds are carbamates and thiocarbamates having the general formula:

$$R_1-CH_2-O-\overset{\overset{R_3}{\|}}{C}-\underset{\underset{R_2}{|}}{N}-H \quad (I)$$

in which $R_1$ is a pyridyl radical, N-oxypyridyl or phenyl radical which is mono-, di- or tri-substituted by methoxy groups, $R_2$ is a lower alkyl, pyridyl, N-oxypyridyl, phenyl radical or a phenyl radical mono-, di- or tri-substituted by halogen, methyl or methoxy groups, and $R_3$ is oxygen or sulphur, with the reservation that, when $R_3$ is oxygen, on one hand, $R_1$ and $R_2$ are not simultaneously a pyridyl and a phenyl radical respectively, and on the other, $R_2$ is a pyridyl or N-oxypyridyl radical, when $R_1$ is a phenyl radical mono-, di- or tri-substituted by methoxy groups, and the acid addition salts of these carbamates and thiocarbamates.

To prepare the compounds (I), the alcohol $$R_1-CH_2-OH$$

is reacted with an isocyanate or isothiocyanate $$R_2-N=C=R_3$$

$R_1$, $R_2$ and $R_3$ having the aforementioned significations. According to a variant, when $R_3$ is oxygen, the alcohol $R_1-CH_2-OH$ can be reacted with an azide $R_2CON_3$ instead of the isocyanate. In each case the reaction is advantageously carried out in an organic solvent, such as benzene or toluene, by heating under reflux for a few hours. Preferably, a tertiary base, such as triethylamine, is added to the reaction medium.

One manner of carrying out said process is the following: 1/10 mole of alcohol and 1/10 mole of isocyanate, isothiocyanate or azide are heated under reflux generally for 3 hours in 100 ml. of anhydrous benzene in the presence, or not in the presence of, a few drops of triethylamine. When cold, the carbamate or thiocarbamate precipitates, if not, the benzene is eliminated under a vacuum, the precipitate or the residue obtained is thereafter distilled or recrystallized, either in a solvent, such as generally isopropanol or ethanol, carbon tetrachloride, cyclohexane etc., or by dissolving it in water in the form of hydrochloride, followed by filtration and reprecipitation by sodium hydroxide.

As concerns the identification and analysis of these products, in addition to the usual methods (melting point, infra-red spectrum, micro analysis) it is always possible to very easily titrate the nitrogen engaged in the pyridine heterocycle in a non-aqueous medium (acetic acid) by perchloric acid, to the exclusion of nitrogen of the carbamate function which is not titrated in this way.

Thus, there have been prepared the compounds (I) shown in the following table in accordance with the examples given hereinafter by way of illustration.

| Example: | $R_1$ | $R_2$ | $R_3$ |
|---|---|---|---|
| 1 | 2-pryidyl | 3,4,5-trimethoxyphenyl | O |
| 2 | 3-pyridyl | Methyl | O |
| 3 | do | Ethyl | O |
| 4 | do | Isopropyl | O |
| 5 | do | P. tolyl | O |
| 6 | do | P. chlorophenyl | O |
| 7 | do | P. methoxyphenyl | O |
| 8 | do | 3,4-dimethoxyphenyl | O |
| 9 | do | 3,5-dimethoxyphenyl | O |
| 10 | do | 3,4,5-trimethoxyphenyl | O |
| 11 | do | 3-pyridyl | O |
| 12 | do | Phenyl | S |
| 13 | 4-pyridyl | Isopropyl | O |
| 14 | do | P. tolyl | O |
| 15 | do | P. chlorophenyl | O |
| 16 | do | P. fluorophenyl | O |
| 17 | do | P. methoxyphenyl | O |
| 18 | do | 3,4-dimethoxyphenyl | O |
| 19 | do | 3,5-dimethoxyphenyl | O |
| 20 | do | 3,4,5-trimethoxyphenyl | O |
| 21 | do | 3-pyridyl | O |
| 22 | do | 4-pyridyl | O |
| 23 | do | Phenyl | S |
| 24 | 3 N-oxypyridyl | do | O |
| 25 | 4 N-oxypyridyl | do | O |
| 26 | do | 3,4,5-trimethoxyphenyl | O |
| 27 | P. methoxyphenyl | 4-pyridyl | O |
| 28 | 3,4,5-trimethoxyphenyl | 3-pyridyl | O |
| 29 | do | 4-pyridyl | O |
| 30 | do | 3 N-oxypyridyl | O |

Example 1.—2-pyridylmethyl-N-3,4,5-trimethoxyphenylcarbamate ($C_{16}H_{18}N_2O_5$)

11.65 g. of 3,4,5-trimethoxybenzoic acid azide (obtained by the action of sodium azide on the acid chloride) and 5.45 g. of 2-pyridinylcarbinol are heated under reflux for 2 hours in 50 ml. of anhydrous benzene. In the cold, no precipitation takes place; the oil obtained by concentrating the solution under a vacuum, crystallizes overnight at 0° C.

By recrystallization from isopropanol, 9 g. of product are obtained. Melting point=104° C. Soluble in water when hot and in ethanol.

*Analysis.*—The nitrogen engaged in the pyridine cycle is assayed with perchloric acid in anhydrous acetic acid (method employing a non-aqueous medium denoted by NAM in the other examples). Nitrogen.—Theory: 4.40%. Found: 4.43%.

Microanalysis.—M.W. 318.3, theory, percent: C, 60.37; H, 5.70; N, 8.80. Found, percent: C, 60.23; H, 5.69; N, 8.93.

Infra-red spectrum: C=O band to about 1725 cm.$^{-1}$.

Example 2.—3-pyridylmethyl-N-methylcarbamate ($C_{18}H_{10}N_2O_2$)

10.9 g. of 3-pyridylcarbinol and 5.7 g. of methyl isocyanate are heated under reflux for 3 hours in 100 ml. of anhydrous benzene in the presence of a few drops of triethyl amine. After elimination of the benzene, the product is distilled at 135–38° C./1 mm.; 11 g. are obtained. Melting point=42° C., soluble in water and ethanol.

Analysis.—Pyridine nitrogen assayed by the NAM method, theory: 8.43%. Found: 8.42%.

Microanalysis.—M.W. 166.2, theory, percent: C, 57.82; H, 6.06; N, 16.86. Found, percent: C, 57.43 and 57.48; H, 5.81 and 6.00; N, 17.11 and 17.04.

Infrared spectrum: C=O band at about 1720 cm.$^{-1}$.

Example 3.—3-pyridylmethyl-N-ethylcarbamate ($C_9H_{12}N_2O_2$)

The same procedure as in Example 2 is adopted, but the methyl isocyanate is replaced by 7.1 g. of ethyl isocyanate. The product is distilled at 139–42° C./1 mm.; 11.7 g. are obtained. Melting point: 43° C., very soluble in water and ethanol.

Analysis.—Pyridine nitrogen assayed by the NAM method, theory: 7.77%. Found: 7.80%.

Microanalysis.—M.W. 180.2, theory, percent: C, 59.98; H, 6.71; N, 15.54. Found, percent: C, 59.84 and 59.79; H, 7.00 and 6.71; N, 15.58.

Infrared spectrum: C=O band at about 1720 cm.$^{-1}$.

Example 4.—3-pyridylmethyl-N-isopropylcarbamate ($C_{10}H_{14}N_2O_2$)

The same procedure as in Example 2 is adopted, but the methyl isocyanate is replaced by 8.5 g. of isopropyl isocyanate. After elimination of the benzene, the oily residue crystallizes upon addition of ether. The carbamate is recrystallized in ether. 9 g. are obtained, melting at 78–80° C. and soluble in water and ethanol.

Analysis.—Pyridine nitrogen assayed by the NAM method, theory: 7.21%. Found: 7.29 and 7.30%.

Microanalysis.—M.W. 194.2, theory, percent: C, 61.83; H, 7.26; N, 14.42. Found, percent: C, 61.89; H, 7.30; N, 14.41.

Infrared spectrum: C=O band only slightly distinct and wide between about 1670 and 1710 cm.$^{-1}$.

Example 5.—3-pyridylmethyl-N-p.tolylcarbamate ($C_{14}H_{14}N_2O_2$)

10.9 g. of 3-pyridylcarbinol and 13.3 g. of p.tolyl isocyanate are put in contact in 100 ml. of anhydrous benzene; a violent thermic effect is observed. The reaction is completed by heating under reflux for 1 hour. Cold, the product precipitates, it is recrystallized in isopropanol, then dissolved in an N/10 hydrochloric acid solution which is filtered. Upon addition of N-sodium hydroxide, 22.4 g. are obtained. Melting point=136° C., almost insoluble in water, soluble in ethanol.

Analysis.—Pyridine nitrogen assayed by the NAM method, theory: 5.78%. Found: 6.85%.

Microanalysis.—M.W. 242.3, theory, percent: C, 69.40; H, 5.82; N, 11.56. Found, percent: C, 69.09 and 69.20; H, 6.0 and 6.02; N, 11.72 and 11.77.

Infrared spectrum: C=O band at about 1725 cm.$^{-1}$.

Example 6.—3-pyridylmethyl-N-p.chlorophenyl-carbamate ($C_{13}H_{11}ClN_2O_2$)

10.9 g. of 3-pyridylcarbinol and 15.4 g. of p.chlorophenyl isocyanate are put in contact in 100 ml. of anhydrous benzene. A thermic effect is observed. The reaction is completed by heating under reflux for 1 hour. Cold the product precipitates, is recrystallized in isopropanol, then dissolved in an N/2 hydrochloric acid solution, which is filtered. By an addition of N/2 sodium hydroxide the carbamate precipitates. 13.3 g. are obtained. Melting point=180–2° C., almost insoluble in water, slightly soluble in ethanol at room temperature.

Analysis.—Pyridine nitrogen assayed by the NAM method, theory: 5.33%. Found: 5.32%.

Microanalysis.—M.W. 262.7, theory percent: C, 59.44; H, 4.22; N, 10.66; Cl, 13.50. Found, percent: C, 59.46; H, 4.33; N, 10.37 and 10.55; Cl 13.47.

Infrared spectrum: C=O band at about 1725 cm.$^{-1}$.

Example 7.—3-pyridylmethyl-N-p.methoxyphenyl-carbamate ($C_{14}H_{14}N_2O_3$)

10.9 g. of 3-pyridylcarbinol and 15 g. of p.methoxyphenyl isocyanate are heated under reflux for 2 hours in 100 ml. of anhydrous benzene. A precipitate rapidly forms. The product is treated as in Example 6. 22 g. are obtained. Melting point=148–5° C. almost insoluble in water, slightly soluble in ethanol at room temperature.

Analysis.—Pyridine nitrogen assayed by the NAM method, Theory: 5.43%. Found: 5.47 and 5.42%.

Micronanalysis.—M.W. 258.3, theory percent: C, 65.10; H, 5.46; N, 10.85. Found percent: C, 64.97; H, 5.42; N, 10.68.

Infrared spectrum: C=O band at about 1725 cm.$^{-1}$.

Example 8.—3-pyridylmethyl-N-3,4-dimethoxyphenyl-carbamate ($C_{15}H_{16}N_2O_4$)

10.9 g. of 3-pyridylcarbinol and 21 g. of 3,4-dimethoxybenzoic acid azide (obtained by the action of sodium azide on acid chloride) are heated under reflux for 2 hr. 30 min. in 100 ml. of anhydrous benzene. Cold, the product precipitates. It is recrystallized in isopropanol, then dissolved in an N/10 hydrochloric acid solution, which is filtered. By the addition of N sodium hydroxide, the carbamate precipitates. 19 g. are obtained. Melting point= 122–4° C., almost insoluble in water, soluble in ethanol.

Analysis.—Pyridine nitrogen assayed by the NAM method, Theory: 4.86%. Found: 4.88 and 4.93%.

Microanalysis.—M.W. 288.3, theory percent: C, 62.49; H, 5.59; B, 9.72. Found percent: C, 62.54; H, 5.42; B, 9.49.

Infrared spectrum: C=O band at about 1725 cm.$^{-1}$.

Example 9.—3-pyridylmethyl-N-3,5-dimethoxyphenyl-carbamate ($C_{15}H_{16}N_2O_4$)

10.9 g. of 3-pyridylcarbinol and 21 g. of 3,5-dimethoxybenzoic acid azide (obtained by the action of sodium azide on acid chloride) are heated under reflux for 3 hr. in 100 ml. of anhydrous benzene. Cold, the product precipitates. It is treated as in Example 8. 17.3 g. are obtained. Melting point=152–4° C., almost insoluble in water, soluble in ethanol.

Analysis.—Pyridine nitrogen assayed by the NAM method, Theory: 4.86%. Found: 4.88 and 4.89%.

Microanalysis.—M.W. 288.3, theory percent: C, 62.49; H, 5.59; N, 9.72. Found percent: C, 62.55 and 62.36; H, 5.37 and 5.54; N, 9.90.

Infrared spectrum: C=O band at about 1720 cm.$^{-1}$

Example 10.—3-pyridylmethyl-N-3,4,5-trimethoxyphenylcarbamate ($C_{16}H_{18}N_2O_5$)

4.5 g. of 3-pyridylcarbinol are treated with 9.6 g. of 3,4,5-tritmethoxybenzoic acid azide in 40 cc. of anhydrous benzene while heating under reflux for 2 hr. Cold, the carbamate precipitates from the benzene solution. After recrystallization in ethanol, 10.4 g. of product are obtained. Melting point=150° C., almost insoluble in water and soluble in ethanol when hot.

Analysis.—Pyridine nitrogen assayed by the NAM method, Theory: 4.40%. Found: 4.41%.

Microanalysis.—M.W. 318.3, theory percent: C, 60.37; H, 5.70; N, 8.80. Found, percent: C, 60.04 and 60.21; H, 5.77 and 5.99; N, 8.85.

Infrared spectrum: C=O band at about 1725 cm.$^{-1}$.

Example 11.—3-pyridylmethyl-N-3-pyridylcarbamate ($C_{12}H_{11}N_3O_2$)

13.3 g. of nicotinic acid azide (obtained by the action of nascent nitrous acid on nicotinic hydrazide) and 10.9 g. of 3-pyridylcarbinol are heated in 100 cc. of anhydrous benzene under reflux for 2 hr. Cold, the carbamate percipitates. After recrystallization in water: 15.4 g. of product are obtained. Melting point=150° C., soluble in water when hot and in ethanol.

*Analysis.*—Pyridine nitrogen assayed by the NAM method (two nitrogen atoms), Theory: 12.22%. Found: 12.36%.

*Microanalysis.*—M.W. 292.2, theory percent: C, 62.87; H, 4.84; N, 18.33. Found percent: C, 63.28 and 63.46; H, 4.97 and 5.17; N, 18.57 and 18.47.

Infrared spectrum: C=O band at about 1725 cm.$^{-1}$.

Example 12.—3-pyridylmethyl-N-phenylthiocarbamate ($C_{13}H_{12}N_2OS$)

8.2 g. of 3-pyridylcarbinol and 10 g. of phenyl isothiocyanate are heated in 75 cc. of anhydrous benzene under reflux for 10 hours. After being left 72 hours at room temperature, 8 g. of slightly coloured thiocarbamate precipitates in the cold. It is dissolved in the minimum of acetone, treated for 10 minutes with animal charcoal and, after filtration, the product precipitates upon addition of water. Melting point=128° C. Almost insoluble in water and soluble in ethanol.

*Analysis.*—Pyridine nitrogen assayed by the NAM method, Theory: 5.73%. Found: 5.67%.

*Microanalysis.*—M.W. 244.3, theory percent: C, 63.91; H, 4.95; N, 11.47; C, 13.12. Found percent: C, 64.07; H, 4.93; N, 11.30; S, 13.52 and 13.47.

Infrared spectrum: bands of a maximum intensity at about 1120 cm.$^{-1}$ and 1390 cm.$^{-1}$.

Example 13.—4-pyridylmethyl-N-isopropylcarbamate ($C_{10}H_{14}N_2O_2$)

10.9 g. of 4-pyridylcarbinol and 8.5 g. of isopropyl isocyanate are heated under reflux for 3 hours in 100 ml. of anhydrous benzene in the presence of a few drops of triethylamine. After elimination of the benzene the oily residue crystallizes only after several days. 6.1 g. of product are obtained. It is dissolved in ether and traces of insoluble N,N'-di-isopropylurea are filtered after evaporation of the ether under a vacuum, the crystallized residue is dissolved in an N/2 hydrochloric acid solution, which is filtered, by the addition of N/2 sodium hydroxide the carbamate precipitates. M.P.=68° C., soluble in water and ethanol.

*Analysis.*—Pyridine nitrogen assayed by the NAM method, Theory: 7.21%. Found: 7.21%.

*Microanalysis.*—M.W. 194.2, theory percent: C, 61.83; H, 7.26; N, 14.42. Found percent: C, 61.66; H, 7.45; N, 14.73.

Infrared spectrum: C=O band only slightly distinct and wide between 1670 and 1710 cm.$^{-1}$.

Example 14.—4-pyridylmethyl-N-p.tolylcarbamate ($C_{14}H_{14}N_2O_2$)

10.9 g. of 4-pyridylcarbinol and 13.3 g. of p.tolylisocyanate are put in contact in 100 cc. of anhydrous benzene. A slight thermic effect is observed. The reaction is completed by 2 hours of heating under reflux. When cold, the product precipitates, it is recrystallized in isopropanol, then dissolved in an N/10 hydrochloric acid solution, which is filtered, upon the addition of N sodium hydroxide the carbonate precipitates. 19.2 g. thereof are obtained. Melting point=143° C., almost insoluble in water, soluble in ethanol.

*Analysis.*—Pyridine nitrogen assayed by the NAM method, theory: 5.78%. Found: 5.85 and 5.89%.

*Microanalysis.*—M.W. 242.3, theory percent: C, 69.40; H, 5.82; N, 11.56. Found percent: C, 69.13; H, 5.78; N, 11.71.

Infrared spectrum: C=O band at about 1720 cm.$^{-1}$.

Example 15.—4-pyridylmethyl-N-p.chlorophenyl-carbamate ($C_{13}H_{11}ClN_2O_2$)

10.9 g. of 4-pyridylcarbinol and 15.4 g. of p.chlorophenyl isocyanate are heated under reflux for 2 hours in 100 ml. of anhydrous benzene. When cold, the product precipitates, it is dissolved in a 50% solution of N/10 hydrochloric acid and ethanol which is filtered. Upon addition of N sodium hydroxide, the carbamate precipitates. 15.8 g. are obtained. Melting point=169–170° C., almost insoluble in water, soluble in ethanol.

*Analysis.*—Pyridine nitrogen assayed by the NAM method, theory: 5.33%. Found: 5.31 and 5.33%.

*Microanalysis.*—M.W. 262.7, theory percent: C, 59.44; H, 4.22; N, 10.66; Cl, 13.50. Found percent: C, 59.64; H, 4.45; N, 10.76; Cl, 13.52.

Infrared spectrum: C=O band at about 1720 cm.$^{-1}$.

Example 16.—4-pyridylmethyl-N-p.fluorophenyl-carbamate ($C_{13}H_{11}FN_2O_2$)

10.9 g. of 4-pyridylcarbinol and 13.7 g. of p.fluorophenyl isocyanate are heated under reflux for 4 hours in 100 ml. of anhydrous benzene. When cold, the product precipitates. It is treated as in Example 15. 19.7 g. are obtained. Melting point=148° C., almost insoluble in water, soluble in ethanol.

*Analysis.*—Pyridine nitrogen assayed by the NAM method, theory: 5.69%. Found: 5.66%.

*Microanalysis.*—M.W. 246.2, theory percent: C, 63.41; H, 4.50; N, 11.38; F, 7.72. Found percent: C, 63.57; H, 4.34; N, 11.31; F, 7.92.

Infrared spectrum: C=O band at about 1710 cm.$^{-1}$.

Example 17.—4-pyridylmethyl-N-p.methoxyphenyl-carbamate ($C_{14}H_{14}N_2O_3$)

10.9 g. of 4-pyridylcarbinol and 15 g. of p.methoxyphenyl isocyanate are heated under reflux for 2 hours in 100 ml. of anhydrous benzene. When cold, the product precipitates, it is dissolved in a 0.2 N hydrochloric acid solution which is filtered. Upon addition of N sodium hydroxide the carbamate precipitates. It is recrystallized in ethanol. 19.6 g. are obtained. Melting point=114° C., soluble in water when hot and in ethanol when hot.

*Analysis.*—Pyridine nitrogen assayed by the NAM method, theory: 5.43%. Found: 5.38 and 5.46%.

*Microanalysis.*—M.W. 258.3, theory percent: C, 65.10; H, 5.46; N, 10.85. Found percent: C, 64.82; H, 5.30; N, 10.64.

Infrared spectrum: C=O band at about 1710 cm.$^{-1}$.

Example 18.—4-pyridylmethyl-N-3,4-dimethoxyphenyl-carbamate ($C_{15}H_{16}N_2O_4$)

10.9 g. of 4-pyridylcarbinol and 21 g. of 3,4-dimethoxybenzoic acid azide (obtained by the action of sodium azide on acid chloride) are heated for 2 hr. 30 min. to boiling point in 100 ml. of anhydrous benzene. When cold, the product precipitates, it is recrystallized in isopropanol, then dissolved in an N/10 hydrochloric acid solution, which is filtered. Upon addition of N sodium hydroxide, the carbamate precipitates. 19.6 g. are obtained. Melting point=130° C., soluble in water when hot and in ethanol.

*Analysis.*—Pyridine nitrogen assayed by the NAM method, theory: 4.86%. Found: 4.87 and 4.88%.

*Microanalysis.*—M.W. 288.3, theory percent: C, 62.49; H, 5.59; N, 9.72. Found percent: C, 62.49; H, 5.62; N, 9.83.

Infrared spectrum: C=O band at about 1710 cm.$^{-1}$.

Example 19.—4-pyridylmethyl-N-3,5-dimethoxyphenyl-carbamate ($C_{15}H_{16}N_2O_4$)

10.9 g. of 4-pyridylcarbinol and 21 g. of 3,5-dimethoxy-benzoic acid azide (obtained by the action of sodium azide on acid chloride) are heated under reflux for 3 hours in 100 ml. of anhydrous benzene. When cold, the product precipitates. It is dissolved in an N/10 hydrochloric acid solution, which is filtered. Upon addition of N sodium hydroxide, the carbamate precipitates. It is recrystallized in ethanol. 21 g. are obtained. Melting point=186° C., almost insoluble in water, slightly soluble in ethanol at ordinary temperature.

*Analysis.*—Pyridine nitrogen assayed by the NAM method, theory: 4.86%. Found: 4.88%.

*Microanalysis.*—M.W. 288.3, theory percent: C, 62.49; H, 5.59; N, 9.72. Found percent: C, 62.47; H, 5.72; N, 9.87.

Infrared spectrum: C=O band at about 1725 cm.$^{-1}$.

Example 20.—4-pyridylmethyl-N-3,4,5-trimethoxyphenylcarbamate ($C_{16}H_{18}N_2O_5$)

5.45 g. of 4-pyridylcarbinol are treated with 11.65 g. of 3,4,5-trimethoxybenzoic acid azide in 50 cc. of anhydrous benzene under reflux for 2 hours. When cold, the carbamate precipitates from the benzene solution. It is recrystallized in ethanol. 12 g. are obtained. Melting point=147° C., almost insoluble in water and soluble when hot in ethanol.

*Analysis.*—Pyridine nitrogen assayed by the NAM method, Theory: 4.40%. Found: 4.25%.

*Microanalysis.*—M.W. 318.3, theory percent: C. 60.37; H, 5.70; N, 8.80. Found percent: C, 60.18; H, 5.65; N, 8.96.

Infrared spectrum: C=O band at about 1725 cm.$^{-1}$.

Example 21.—4-pyridylmethyl-N-3-pyridylcarbamate ($C_{12}H_{11}N_3O_2$)

10.9 g. of 4-pyridylcarbinol and 14.8 g. of nicotinic acid azide (prepared by the action of the nascent nitrous acid on nicotinic hydrazide) are heated under reflux in 100 ml. of anhydrous benzene. When cold, the product precipitates, it is recrystallized in isopropanol and dissolved in an N hydrochloric acid solution, which is filtered. Upon addition of N sodium hydroxide the carbamate precipitates. 12.8 g. are obtained. Melting point=134° C., soluble in water when hot and soluble in ethanol.

*Analysis.*—Pyridine nitrogen assayed by the NAM method, Theory: 12.22%. Found: 12.39% (2 nitrogen atoms).

*Microanalysis.*—M.W. 229.2, theory percent: C, 62.87; H, 484; N, 18.33. Found: C, 62.96; H, 5.01; N, 18.68.

Infrared spectrum: C=O band at about 1720 cm.$^{-1}$.

Example 22.—4-pyridylmethyl-N-4-pyridylcarbamate ($C_{12}H_{11}N_3O_2$)

10.9 g. of 4-pyridylcarbinol are added to 250 ml. of an anhydrous benzenic solution of isonicotinic acid azide (prepared in water by the action of nascent nitrous acid on 13.7 g. of isonicotinic hydrazide, followed by extractions with benzene). The mixture is heated under reflux for 3 hours. When cold, the carbamate precipitates. It is recrystallized in isopropanol. 9.8 g. of product are obtained. Melting point=182° C., soluble in water when hot and in ethanol.

*Analysis.*—Pyridine nitrogen assayed by the NAM method, Theory: 12.22%. Found: 12.35% (2 nitrogen atoms).

*Microanalysis.*—M.W. 229.2, theory percent: C, 62.87; H, 4.84; N, 18.33. Found percent: C, 62.98; H, 4.95; N, 18.65.

Infrared spectrum: C=O band at about 1720 cm.$^{-1}$.

Example 23.—4-pyridylmethyl-N-phenylthiocarbamate ($C_{13}H_{12}N_2OS$)

8.2 g. of 4-pyridylcarbinol and 10 g. of phenyl isothiocyanate are heated under reflux in 75 ml. of anhydrous benzene for 8 hours in the presence of a few drops of methylamine. After elimination of the benzene under vacuum, the oily residue crystallizes upon addition of isopropanol. It is dissolved in an N/10 hydrochloric acid solution and treated for 10 minutes with animal charcoal. After filtration, the carbamate precipitates upon addition of N sodium hydroxide. 8.3 g. of product are obtained which are recrystallized in isopropanol. Melting point=144° C., almost insoluble in water and soluble in ethanol.

*Analysis.*—Pyridine nitrogen assayed by the NAM method, Theory: 5.73%. Found: 5.68 and 5.74%.

*Microanalysis.*—M.W. 244.3, theory percent. C, 63.91; H, 4.95; N, 11.47; S, 13.12. Found percent: C, 63.60; H, 4.99; N, 11.36; S, 13.01.

Infrared spectrum: bands of a maximum intensity at about 1190 cm.$^{-1}$ and 1390 cm.$^{-1}$.

Example 24.—3-N-oxypyridylmethyl-N-phenylcarbamate ($C_{13}H_{12}N_2O_3$)

11.5 g. of 3-N-oxypyridylcarbinol (obtained by N-oxidation of 3-pyridylcarbinol by means of a mixture of acetic acid and hydrogen peroxide) are treated with 11 g. of phenyl isocyanate in 280 cc. of anhydrous benzene. After two hours of reflux followed by cooling, a precipitate forms. On recrystallization in acetone, 15.5 g. of product are obtained. Melting point: 158° C., soluble in water when hot and in ethanol.

*Microanalysis.*—M.W. 244.2, theory percent: C, 63.93; H, 4.95; N, 11.47. Found percent: C, 64.07 and 64.10; H, 5.13 and 5.12; N, 11.57 and 11.65.

Infrared spectrum: C=O band at about 1730 cm.$^{-1}$.

Example 25.—4, N-oxypridylmethyl-N-phenylcarbamate ($C_{13}H_{12}N_2O_3$)

12.5 of 4,N-oxypyridylcarbinol (obtained by N-oxidation of 4-pyridylcarbinol by means of a mixture of acetic acid and hydrogen peroxide) and 12 g. of phenyl isocyanate are heated under reflux or 10 hours in 100 ml. of anhydrous benzene. The precipitate, which is insoluble when hot, is drained then recrystallized in isopropanol. 10 g. of carbamate are obtained. Melting point=176° C., soluble in water when hot and soluble in ethanol.

*Microanalysis.*—M.W. 244.3, theory percent: C, 63.93; H, 4.95; N, 11.47. Found percent: C, 64.04; H, 4.88; N. 11.61.

Infrared spectrum: C=O band at about 1725 cm.$^{-1}$.

Example 26.—6 N-oxypyridylmethyl-N-3,4,5-trimethoxyphenylcarbamate ($C_{16}H_{18}N_2O_6$)

12.5 g. of 4 N-oxypyridylcarbinol and 23.7 g. of 3,4,5-trimethoxybenzoic acid azide are heated under reflux for 3 hours in 100 ml. of anhydrous benzene in the presence of a few drops of triethylamine. When cold, the carbamate precipitates. After washing with ethanol when hot, 22 g. are obtained. Melting point=240° C., almost insoluble in water and slightly soluble in ethanol when hot.

*Microanalysis.*—M.W. 334.3, theory percent: C, 57.48; H, 5.43; N, 8.38. Found percent: C, 57.45; H, 5.36; N, 8.44.

Infrared spectrum: C=O band at about 1720 cm.$^{-1}$.

Example 27.—p.methoxybenzyl - N-4-pyridylcarbamate ($C_{14}H_{14}N_2O_3$)

13.8 g. of p.methoxybenzylic alcohol are added to 250 ml. of an anhydrous benzenic solution of isonicotinic acid azide. The mixture is heated under reflux for 3 hours. When cold, the carbamate precipitates. It is recrystallized in isopropanol. Melting point=168° C., almost insoluble in water and soluble in ethanol.

*Analysis.*—Pyridine nitrogen assayed by the NAM method, Theory: 5.42%. Found: 5.46%.

*Microanalysis.*—M.W. 258.3, theory percent: C, 65.10, H, 5.46; N, 10.85. Found percent: C, 65.03; H, 5.59; N, 10.91.

Infrared spectrum: C=O band at about 1725 cm.$^{-1}$.

Example 28.—3,4,5-trimethoxybenzyl-N-3-pyridyl-
($C_{16}H_{18}N_2O_5$)

6 g. of 3,4,5-trimethoxybenzylic alcohol are treated with 4.2 g. of a solution of nicotinic acid azide in 30 cc. of anhydrous benzene. After 2 hours of heating under reflux, the carbamate precipitates upon cooling. It is recrystallized in ethanol. 7.4 g. of product are obtained. Melting point=147° C., almost insoluble in water and soluble in ethanol when hot.

*Analysis.*—Pyrdine nitrogen assayed with the NAM method, Theory: 4.40%. Found: 4.37%.

*Micronanalysis.*—M.W. 318.3, theory percent: C, 60.37; H, 5.70; N, 8.80. Found percent: C, 60.29; H, 5.64; N, 8.98.

Infrared spectrum: C=O band at about 1730 cm.$^{-1}$.

Example 29.—3,4,5-trimethoxybenzyl-N-4-pyridyl-
carbamate ($C_{16}H_{18}N_2O_5$)

20 g. of 3,4,5-trimethoxybenzylic alcohol are added to 250 m. of an anhydrous benzenic solution of isonicotinic acid azide. The mixture is heated under reflux for 3 hours. When cold, the carbamate precipitates. It is recrystallized in isopropanol. 20.5 g. of product are obtained. Melting point=142° C., almost insoluble in water and soluble in ethanol.

*Analysis.*—Pyridine nitrogen assayed by the NAM method, Theory: 4.40%. Found: 4.42%.

*Microanalysis.*—M.W. 318.3, theory percent: C, 60.37; H, 5.70; N, 8.80. Found percent: C, 60.13; H, 5.87; N, 8.95.

Infrared spectrum: C=O band at about 1720 cm.$^{-1}$.

Example 30.—3,4,5-trimethoxybenzyl-N-3,N-oxy-
pyridylcarbamate ($C_{16}H_{18}N_2O_6$)

20 g. of 3,4,5-trimethoxybenzylic alcohol and 16.4 g. of N-oxynicotinic azide (melting point and decomposition at 150° C., obtained by the action of nascent nitrous acid on N-oxynicotinic hydrazide) are heated under reflux for 3 hours in 100 cc. of anhydrous benzene in presence of a few drops of triethylamine. After elimination of the benzene under a vacuum, the oily residue crystallizes upon grinding in ether. 23.4 g. of carbamate are obtained and recrystallized in isopropanol. Melting point=110° C., soluble in water and very soluble in ethanol.

*Microanalysis.*—M.W. 334.3, theory percent: C, 57.48; H, 5.43; N, 8.38. Found percent: C, 57.63; H, 5.35; N, 8.43.

Infrared spectrum: C=O bands at about 1720 cm.$^{-1}$.

In a general way, the compounds (I) reduce the activity of the central nervous system and have sedative, hypnogenous, neuroleptic, myorelaxing and antispasmodic effects and sometimes act as a blood pressure lowering agent.

The various properties were revealed by pharmacological tests.

Thus, the compounds (I) produce sleep or otherwise distinctly potentialize the effect of certain hynotics (for example barbiturics, chloral) and sedatives in the mouse. They have an antagonostic effect with regard to psychotonic substances (amphetamines) or convulsive agents (cardiazol, isoniazid) in the rat and mouse.

The study of behaviour was carried out in the mouse by means of the following conventional tests:

Rotation test—traction test—test employing an aperured floor—reactions to stimuli.

This investigation shows notable modifications in the behaviour in the sense of a sedation, a decrease in the reflexes and the reactivity. The products were administered in an aqeuous solution or in suspension in water in the presence of an adapted dispersing agent.

The various administration routes were employed in accordance with the conditions of solubility: the bucal, intraperitoneal, intravenous routes. The most remarkable products are already active by the bucal route at a relatively low dose of the order of 10–50 mg./kg.

As concerns the ratios of structure and pharmacological activity and the selection of the most characteristic products, the following remarks may be made:

(1) Considering the series where $R_1$=2,3 and 4-pyridyl, an activity increasing in the following order is ascertained in all cases:

2-pyridyl<3-pyridyl<4-pyridyl for identical substituents $R_2$.

(2) In respect of $R_1$=2,3 or 4-pyridyl, the nature of the radical at $R_2$ orients distinctly the pharmacological activity and a certain number of compounds are shown to be particularly active. Thus, for example:

(A) In the series where $R_2$=a lower alkyl, the compound 4-pyridylmethyl-N-isopropylcarbamate (Example 13) is distinguished.

(B) In the series where $R_2$=substituted phenyl, several cases occur:

(a) The presence of a methyl group in para position on the phenyl nucleous is advantageous and increases the activity relative to the phenyl group alone. Thus, N-p.methylphenylcarbamate is distinguished from 4-pyridyl methyl (Example 14);

(b) The series where $R_2$=p.methoxyphenyl, dimethoxyphenyl, trimethoxyphenyl are still more interesting.

In these series the influence of the $R_1$ structure, depending on whether it is 2,3 or 4-pyridyl, is quite characteristic although the 3-pyridyl compounds are already very active. The following compounds are reveaIed:

4-pyridylmethyl N-p.methoxyphenylcarbamate (Example 17);

3 or 4-pyridylmethyl N-dimethoxy-3,4-phenylcarbamate (Examples 8 and 18);

3 or 4 pyridylmethyl N-dimethoxy-2,6-phenylcarbamate (compounds not described in the examples but prepared in accordance with the procedures of the latter);

4-pyridylmethyl N-trimethoxy - 3,4,5 - phenylcarbamate (Example 20).

The latter compound was shown to be active in all the pharmacological tests carried out at doses of 5–25 mg./kg. It is observed also that in these series the permutation of $R_1$ to $R_2$ and conversely from $R_2$ to $R_1$ is not manifested by a modification of the type of activity and the products remain sedative, but this transposition sometimes results in a reduced toxicity.

Thus, the analogous inverted isomer of the 4-pyridylmethyl N-trimethoxy-3,4,5-phenylcarbamate (Example 20) which becomes N-4-pyridylcarbamate of the alcohol 3,4,5-trimethoxybenzyl (Example 29) is quite remarkable. It is but slightly hypnotic in itself but is highly potentializes the narcosis produced. It produces in the mouse an erection of the tail similar to Straub's phenomenon. It would seem that there is a specific sensitivity of the receptors to the compounds which associate in one direction or the other the pyridyl and the mono- or polymethoxybenzyl nuclei linked by a carbamic function;

(c) When $R_2$ is a phenyl substituted by a halogen, 4-pyridylmethyl N-p.fluorophenylcarbamate (Example 16) is very active.

(C) A very active class of products is provided by the substitution $R_2$=pyridyl.

The effects of the compounds 4-pyridylmethyl N-3-pyridylcarbamate (Example 21) and its isomer N-4-pyridylcarbamate (Example 22) are closely similar.

(3) The derivatives where $R_1$=N-oxypyridyl are often very active and it is of interest to employ the derivatives where $R_1$=N-oxy-4-pyridyl.

(4) The derivatives of the inverted series where $R_1$ becomes methoxy, di- or trimethoxy phenyl and $R_2$ pyridyl are also capable of providing interesting N-oxy-pyridyl compounds.

(5) When $R_3$=S, the activity can be increased without a noticeable repercussion on the toxicity.

The compounds (I) are thus employed in human clinic as sedatives, hypnogenous and neuroleptic agents, in particular as tranquilizers and antispasmodic agents. The dose of the compounds are adapted to each case. In these indications, the compounds (I) can be put into form with the usual excipients and vehicles for administration by the bucal, parenteral or rectal route. The forms capable of being absorbed by the bucal route are advantageously tablets and capsules.

The injectable solutions are obtained with compounds which are soluble right from the start or soluble in the state of salts by addition of a pharmaceutically acceptable salifying acid.

It must be understood that the invention is not intended to be limited by the described methods of carrying out the invention which have been given merely by way of examples.

Having now described our invention what we claim as new and desire to secure by Letters Patent is:

1. A compound selected from the group consisting of carbamates and thiocarbamates having the general formula:

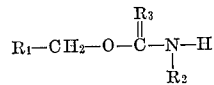

in which $R_1$ is a radical selected from the group consisting of pyridyl, N-oxypyridyl and phenyl mono-, di- and trisubstituted at positions 3-, 4- and 5- by methoxy groups, $R_2$ is a radical selected from the group consisting of lower alkyl, pyridyl, N-oxypyridyl, phenyl, halophenyl, tolyl and phenyl mono-, di- and trisubstituted at positions 3-, 4- and 5- by methoxy groups, and $R_3$ is selected from the group consisting of oxygen and sulphur, with the reservation that, on one hand, $R_2$ is a radical selected from the group consisting of pyridyl and N-oxypyridyl, when $R_1$ is a radical selected from the group consisting of phenyl mono-, di- and trisubstituted by methoxy groups, and, on the other hand, when $R_3$ is oxygen, $R_1$ and $R_2$ are not simultaneously pyridyl and phenyl respectively, and an acid addition salt thereof with a proviso that when $R_3$ is sulphur $R_1$ is a pyridyl radical.

2. 4-pyridylmethyl-N-isopropylcarbamate.
3. 4-pyridylmethyl-N-3,4-dimethoxy-phenylcarbamate.
4. 4-pyridylmethyl-N-3,4,5 - trimethoxy - phenylcarbamate.
5. 3,4,5-trimethoxy benzyl-N-3-pyridylcarbate.
6. 4-pyridylmethyl-N-4-pyridylcarbamate.

References Cited

UNITED STATES PATENTS 3,290,351  12/1966  McKay et al. _____ 260—455

FOREIGN PATENTS 945,854  1/1964  Great Britain.

OTHER REFERENCES

Karrer: Organic Chemistry, Elsevier 4th edition (1950), pp. 130, QD 251 K 32.

HENRY R. JILES, *Primary Examiner.*

A. L. ROTMAN, *Assistant Examiner.*

U.S. Cl. X.R.

260—294.8, 455, 471; 424—263, 309